United States Patent
Yen et al.

(10) Patent No.: US 6,871,110 B1
(45) Date of Patent: Mar. 22, 2005

(54) METHOD AND SYSTEM FOR EFFICIENTLY COORDINATING ORDERS WITH PRODUCT MATERIALS PROGRESSING THROUGH A MANUFACTURING FLOW

(75) Inventors: Wei-Kuo Yen, Hsin-Tsu (TW); Yi-Chin Hsu, Hsin-Tsu (TW); Cheng-Che Chen, Hsin-Chu (TW); Chiu-Ju Chen, Ping Tung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 10/656,052

(22) Filed: Sep. 5, 2003

(51) Int. Cl.$^7$ ............................................. G06F 19/00
(52) U.S. Cl. ..................... 700/100; 700/105; 700/106; 700/121; 705/28
(58) Field of Search ................................ 700/100–102, 700/105, 106, 116, 121; 705/28, 29

(56) References Cited

U.S. PATENT DOCUMENTS

| | | | | |
|---|---|---|---|---|
| 5,307,261 A | * | 4/1994 | Maki et al. ..................... 705/29 |
| 5,311,424 A | * | 5/1994 | Mukherjee et al. ............ 705/29 |
| 5,325,304 A | * | 6/1994 | Aoki ........................... 700/100 |
| 5,523,611 A | * | 6/1996 | Mischel et al. ............. 257/461 |
| 5,960,405 A | * | 9/1999 | Trefethan et al. ............... 705/9 |
| 6,222,212 B1 | * | 4/2001 | Lee et al. ..................... 257/207 |
| 6,352,880 B1 | * | 3/2002 | Takai et al. .................. 438/106 |
| 6,448,152 B1 | * | 9/2002 | Henley et al. ............... 438/458 |
| 6,463,345 B1 | * | 10/2002 | Peachey-Kountz et al. ... 700/99 |
| 6,699,727 B1 | * | 3/2004 | Toprac et al. .................. 438/17 |
| 2002/0198619 A1 | * | 12/2002 | Denton et al. .............. 700/107 |
| 2003/0004595 A1 | * | 1/2003 | Seimiya et al. ............... 700/97 |
| 2004/0059650 A1 | * | 3/2004 | Cruz et al. ..................... 705/28 |

* cited by examiner

Primary Examiner—Leo Picard
Assistant Examiner—Elliot Frank

(57) ABSTRACT

A method and system is provided for dynamically coordinating one or more product orders with product parts progressing through a manufacturing process flow. After identifying a first order for generating one or more lots of parts for manufacturing a first product, wherein the first order identifies a predetermined base feature, one or more customer specific features, one or more order specific features, and the quantity of the first product, A smart code is assigned to the first order and the lots of parts, wherein the smart code identifies an association between the first order and the lots of parts. An analysis is then performed, based on the smart codes assigned thereto, to see whether one or more available lots of parts of a second order in production are ready to be converted to produce the first product. The smart code of the available lots is changed to the smart code of the first order if the available lots of the second order are chosen to be further processed for fulfilling the first order.

20 Claims, 4 Drawing Sheets

METHOD AND SYSTEM FOR EFFICIENTLY COORDINATING ORDERS WITH PRODUCT MATERIALS PROGRESSING THROUGH A MANUFACTURING FLOW

BACKGROUND OF THE DISCLOSURE

The present disclosure relates generally to product manufacturing management, and more particularly, to an efficient management of production of high volume and highly customized semiconductor products.

A standard production management process might be to order large quantities of raw materials and reorder when stocks look low. This method is simple and does not require any sophisticated analysis. It is effective for small lot production in a low volume environment. It can also be made effective in a mass-production environment of a single product. This process provides poor response to demand changes. It is ineffective in high-volume, multi-product environments. It often requires carrying large inventories with the related inventory expenses.

A more advanced standard process has been developed that plans inventory purchasing based on orders and forecast. This system is referred to by C>several names, more commonly as MRP (Material Requirements Planning). These systems calculate the quantity of materials and resources required to fill existing orders and forecast. Based on estimated delivery lead-times and the order of assembly, the system generates estimates for a time-sequenced purchasing plan.

MRP works well in large-volume, multi-product environments. It is capable of responding to rapidly changing order environments. However, MRP is not particularly effective in managing production that includes customized orders or frequent change-orders.

What is needed is an efficient method for managing material and resources in support of frequent order changes in a high-volume, continuous-flow, highly-customized manufacturing environment.

SUMMARY OF THE DISCLOSURE

A method and system is provided for dynamically coordinating one or more product orders with product parts progressing through a manufacturing process flow. After identifying a first order for generating one or more lots of parts for manufacturing a first product, wherein the first order identifies a predetermined base feature, one or more customer specific features, one or more order specific features, and the quantity of the first product, A smart code is assigned to the first order and the lots of parts, wherein the smart code identifies an association between the first order and the lots of parts. An analysis is then performed, based on the smart codes assigned thereto, to see whether one or more available lots of parts of a second order in production are ready to be converted to produce the first product. The smart code of the available lots is changed to the smart code of the first order if the available lots of the second order are chosen to be further processed for fulfilling the first order.

Various benefits are achieved over conventional approaches. For instance, opportunities for rerouting or rework of parts are identified, thus reducing costly scrap and resource consuming restarts. Therefore, it could significantly reduce scrap and rework, cost to the customer, lead time for delivery, and plant and material capacity planning.

DETAILED DESCRIPTION

High-volume, continuous-flow, highly-customized manufacturing environments present unique challenges to standard production management. MRP works well in large-volume, standard product environments, it is not effective in managing production that includes highly customized orders or frequent modifications of existing orders (referred to as "change-orders"). Multi-product mass production is exemplified by capacity limits and changing customer demands. This often generates delays and material shortages. Customer orders often must be prioritized to establish up-to-date completion schedules.

Conventionally, each order is given a part number to identify product materials needed and the features of the expected product when the order is entered into a computerized manufacturing management system. Due to the customer's specific customization requirements, most part numbers will be unique to the requested order. For illustration purposes, product materials progressing through the manufacturing flow are referred to as "parts," and they become "products" when all processes are finished thereon. Once the parts have begun processing change-orders can be submitted to change the quantity requirements for one or more parts. A change-order may request quantity changes to multiple parts, each part must be addressed separately, potentially generating scrap and restarts.

Figure 1:
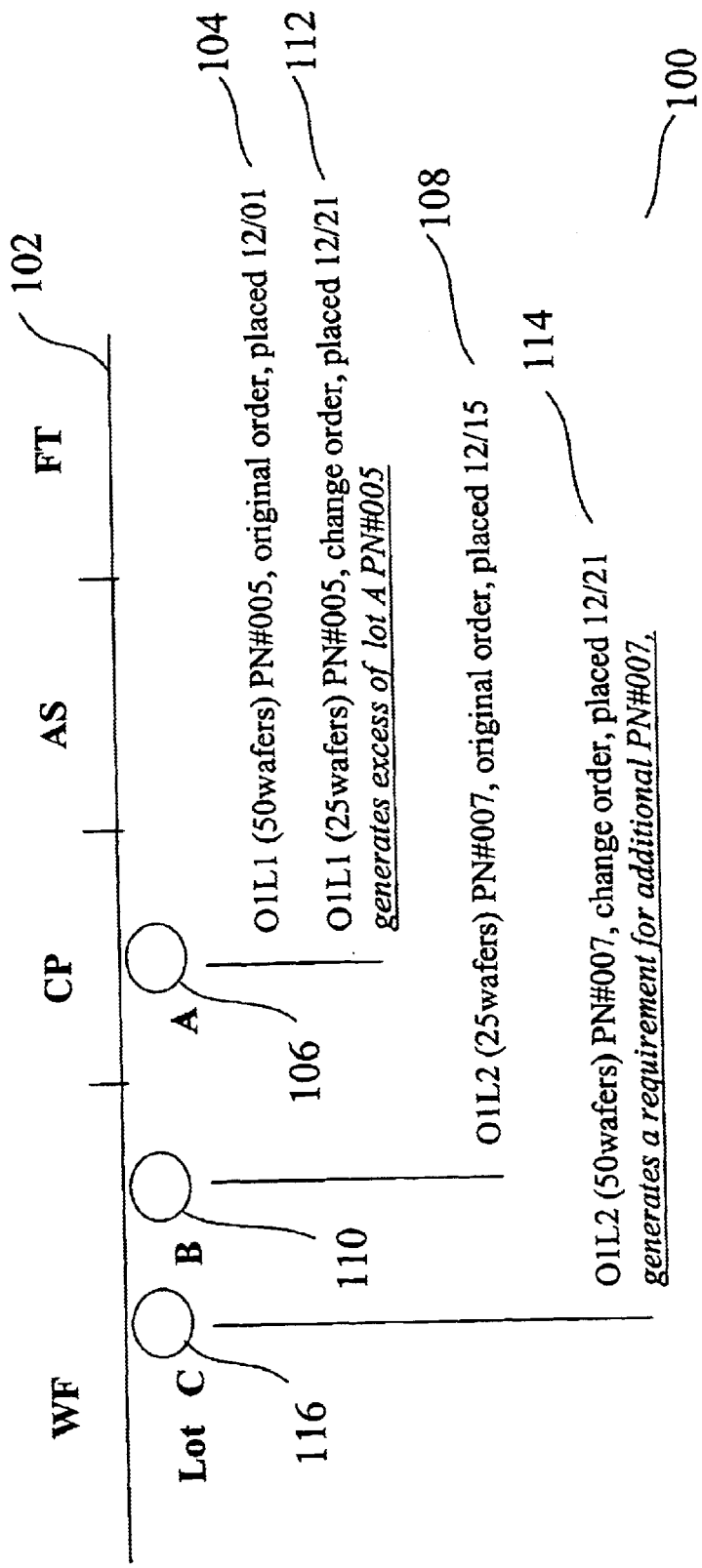
FIG. 1 illustrates an order-flow timing diagram.

The following examples will use custom semiconductor device fabrication as a typical high-volume, highly customized product manufacturing environment. FIG. 1 illustrates a general order-flow timing diagram (100). The orders and lots of parts are shown on various points on a production time-line (102) so as to illustrate their progress through the production flow. Milestones in the process flow are marked as WF, CP, AS, and PT which represent wafer-start, current-probe, assembly, and final-test, respectively.

As illustrated in FIG. 1, a customer places an order with the customer's usual special features for 50 wafers of internal part-number 005. This request is entered on December 1 as O1L1 PN#005, which indicates that it is Line #1 on Purchase Order #1. A new batch of wafers is started and is designated O1L1 PN#005 (104), and is assigned to Lot A (106).

The same customer places another order for 25 wafers of internal part-number 007, with the customer's usual special features. The order is added to the original Purchase Order and is entered on December 15 as O1L2 PN#007 (Line#2 on Purchase Order #1). A new batch of wafers is started and is designated O1L2 PN#007 (108), and is assigned to Lot B (110). It is assumed that finished products of part number 007 are different from those of part number 005, but they all start from the same initial parts.

The same customer submits a change-order on December 21. In this request, the quantity of PN#005 is reduced to 25 wafers (112). As 50 wafers have been started in Lot A to satisfy the original order, there are now 25 extra wafers in Lot A. However, according to the conventional practice, since the 25 wafers in excess are part-numbered as 1L1 PN#005, they cannot be reassigned to another order. As such, the 25 extra wafers become scrap (112), an undesired waste is then unnecessarily introduced in production. Either the manufacturer or the customer will have to pay for the waste.

In the example shown in FIG. 1, the same customer has another change-order (114) on December 21 to increase the quantity of PN#007 to 50 wafers. Normally, this would trigger another request to generate 25 additional wafers. Following Lot B (110), which has already progressed partially through the fabrication flow, a new batch of wafers is started and is designated O1L2 PN#007 (114), and is associated with Lot C (116). The delivery of these new wafers will be later than those in Lot B.

It should be noted that the wafers in Lot A (106) have not yet progressed to a fabrication point that would preclude them from being reassigned to and completed as a portion of O1L2 PN#007. If it is determined that Lot A can be changed as such, this reassignment action taken in the production flow would both eliminate the need of scrapping 25 wafers and starting ~25 additional wafers. Material cost, resource usage, and time would all be saved. In addition, the customer's two orders would be filled sooner. Even though many orders may process through quite a few common process steps, and sometimes, even through identical steps when completed, therefore, they can be reassigned if needed during the process flow. Unfortunately, the conventional part numbering system cannot identify these opportunities.

An improved method according to this disclosure allows identifying and possibly automating opportunities for rerouting uncompleted wafers that have not yet reached the differentiating process step, or returning a wafer lot back to the process line for rework, or both. Since many customer-specific parts have custom features that are identical until a specific step in the manufacturing process, it should be possible to take advantage of parts that are already in the process that might readily be converted to a new request. For example, when a customer places a change-order, a request to increase the quantity of one part could be offset by a request to decrease the quantity of another.

When an order is entered into a manufacturing management system, each order might be given a part number that reflects the base feature, the customer specific features, and the order specific features. Additionally, both the part number and the order number are associated with a "smart code". This code associates orders known to the sales department with product parts known to manufacturing operations personnel.

Figure 2:
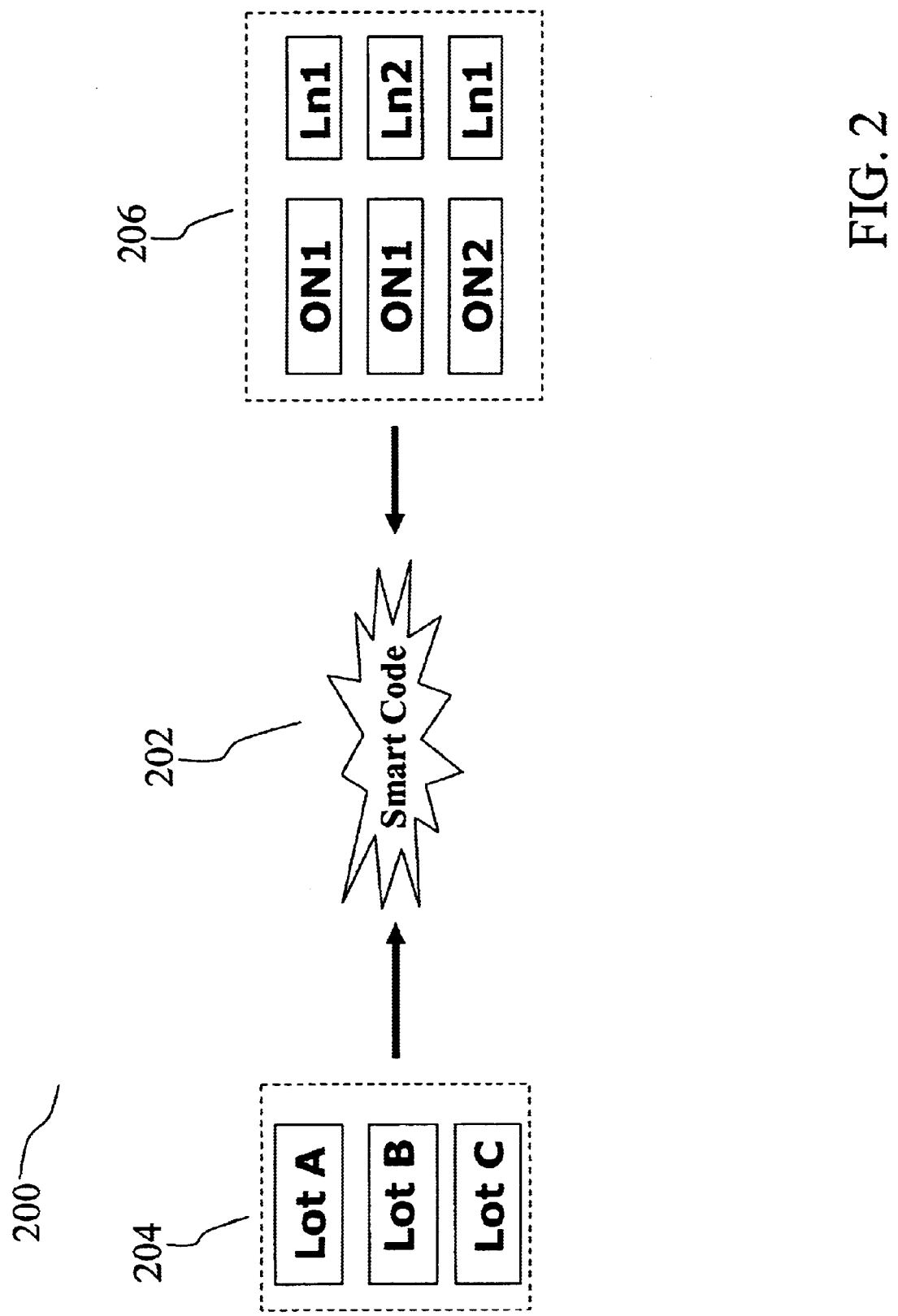
FIG. 2 illustrates the association between product part lots and orders through a smart code.

FIG. 2 is a schematic (200) illustrating the use of smart codes to link lots of wafers with orders. When orders are received and wafer lots are ready to be initiated, smart codes (202) are assigned to each production lot (204) and each purchase order (206). This smart code provides a link that couples a production lot with a particular purchase order as the lot travels through the fabrication process. When needed, the manufacturing management system can automatically search and locate lots that were generated by a particular purchase order using the smart code. For example, when a change-order is requested by a customer to modify a purchase order, it is possible to use the smart code to locate all lots that were originally generated by the purchase order, regardless of their part numbers. Therefore, the smart code has the feature to allow the manufacturing management system to identify parts with different part numbers, which might be available for rearrangement in the change-order situation. Thus, a request to increase the quantity of one part could be offset by a request to decrease the quantity of another. This could significantly reduce scrap and rework.

Figure 3:
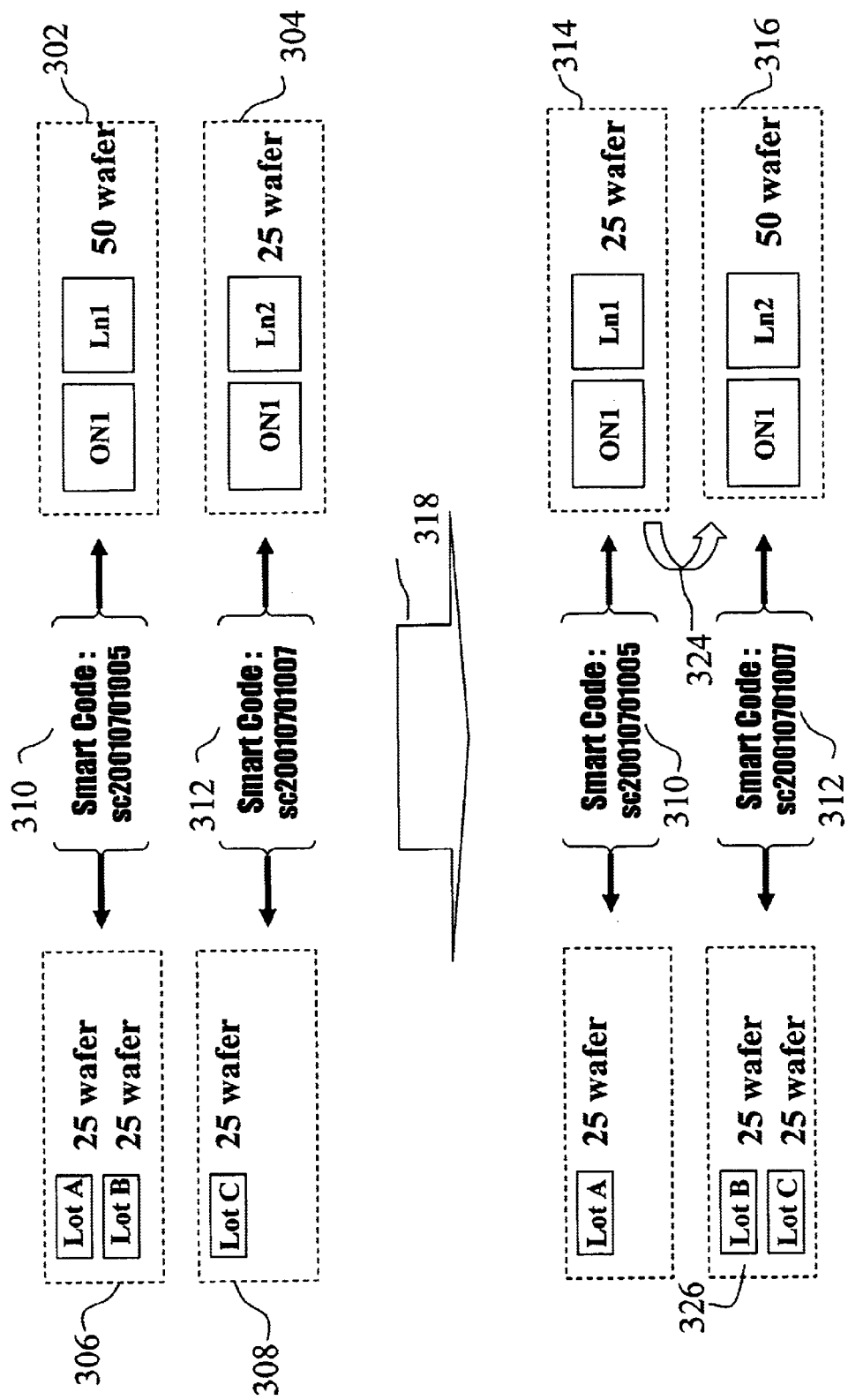
FIG. 3 illustrates a process for re-arranging orders based on an order modification according to one example of the present disclosure.

FIG. 3 illustrates a flow diagram 300 illustrating the use of the smart code to identify and reroute wafers, in order to satisfy a change-order request according to one example of the present disclosure. This wafer lot identification and re-arranging process might be referred to as a Synchronize Order Change (SOC). In the example illustrated, a customer initially places a two-line purchase order. Purchase order one, line-one (302), is a request for 50 wafers PN#005 with their usual special requirements. Purchase order one, line-two (304), is a request for 25 wafers PN#007 with their usual special requirements. Purchase order one, line-one (ON1LN1) is associated with two 25 wafer lots (306), Lot A and Lot B. Purchase order one line-two (ON1LN2) is associated with a single 25-wafer lot (308), Lot C. The orders and the lots are each assigned with a smart code respectively (310 and 312). The sample smart code for ON1LN1 is sc20010701005 and the one for ON1LN2 is sc20010701007. They are only different in the last digit showing that they have different part numbers, and it also shows that they belong to the same customer and are similar in features before being fully completed.

It is assumed that a change-order request is submitted at an arbitrary point in the fabrication process. The change-order modifies ON1LN1 from 50 wafers to 25 wafers (314). The change-order also modifies ON1LN2 from 25 wafers to 50 wafers of PN #007 (316). When this change happens, the SOC process (318) is initiated and examines whether re-arrangement opportunities exist before initiating fresh wafer lots or scrapping any lots. The SOC detects the smart codes (320 and 322) for the orders being changed, i.e., ON1LN1 (302) and ON1LN2 (304). As shown, the smart codes (310 and 312) are used as indices to identify the wafer lots A, B, (306) and C (308) that were initiated for the original order. Order related process progress information is provided that indicates where these wafer lots stand in the fabrication process flow. The key information needed for SOC is whether these lots have progressed to a point that they have had different features incorporated thereon. Based on such information, it is assumed that the SOC determines that wafers can be rerouted (324) to satisfy both changes (314 and 316). As a result, Lot B is rerouted as PN#007, and the smart code sc20010701007 replaces the old smart code sc20010701005 for this lot. The final result is that the change-request is satisfied without scrapping or restarting any wafer lots.

Figure 4:
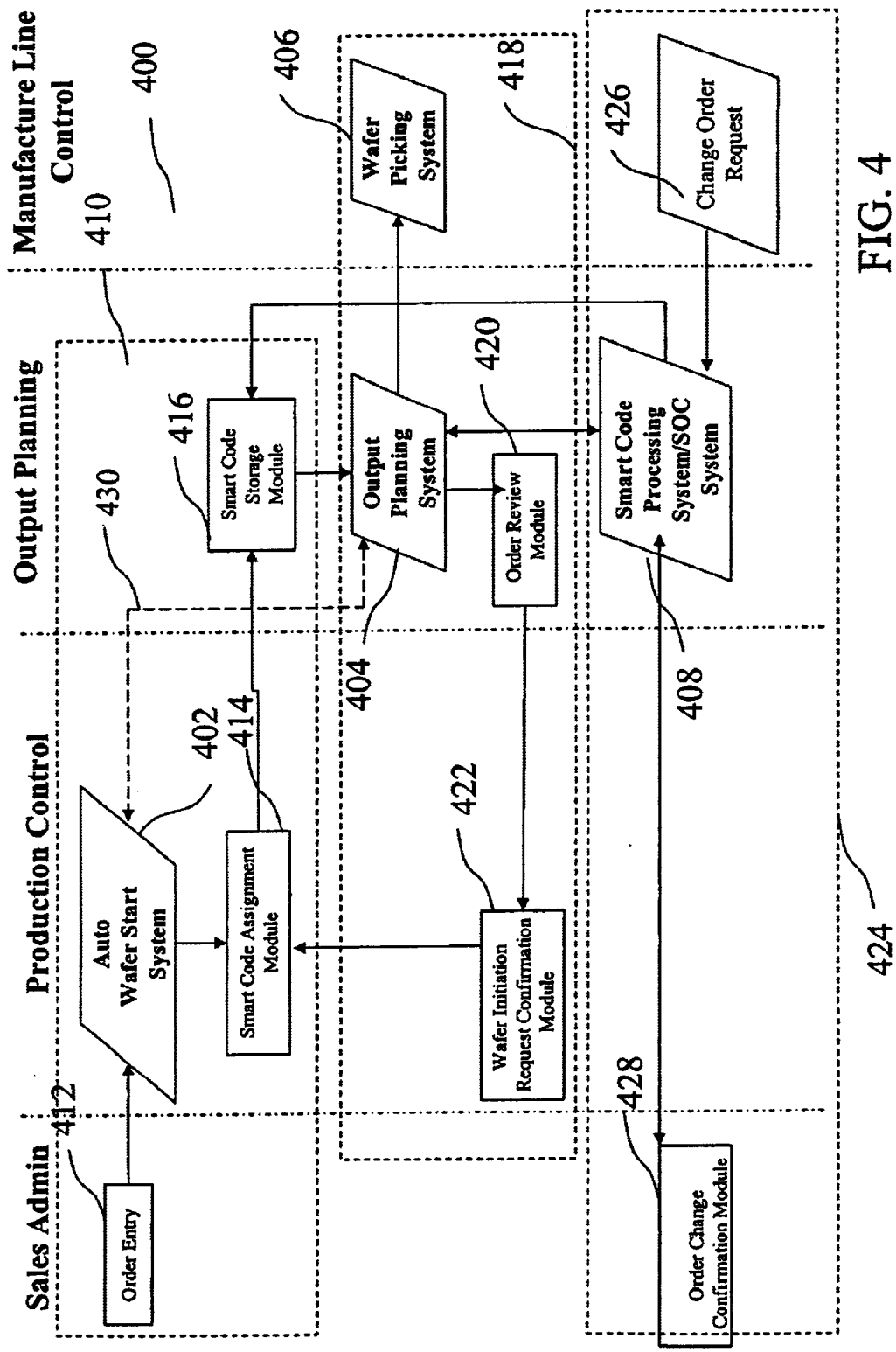
FIG. 4 illustrates a manufacturing process flow for processing orders according to one example of the present disclosure.

FIG. 4 illustrates a relevant portion of a manufacturing process flow (400) according to one example of the present disclosure. A manufacturing management system powered by modern computer systems is used by multiple operators throughout the process flow. It is assumed that the system is networked together so that the information is all in a real time fashion. The manufacturing management system includes both the SOC feature. In this example, the process flow has been divided into three functional stages: Sales Administration, Production Control, Output Planning, and Manufacture Line Control although many other alternatives for dividing the flow are also possible. The following subsystems or modules are included, and will be described in greater detail: Auto Wafer Start System (402), Output Planning System (404), Wafer Picking system (406), Smart Code Processing System (408).

The early part of the manufacturing management system may be referred to as an Order Entry Module (410). An order (412) is entered into the system by the sales administration personnel and might include the base feature number, customer-specific features, order-specific features, and other required data. The order-entry data is provided to the Auto Wafer Start System (402). Normally, the Auto Wafer Start System initiates the production process for fabricating the requested order so that wafer lots are started in the manufacturing process flow. Assuming no SOC is available, smart codes are assigned to the lots and the orders by a smart code assignment module (414). The smart code data is saved in a storage module (416) and made available to the rest of the manufacturing management system. The order data, smart code data, lot data, and any other appropriate data, is particularly important for the Output Planning System (404) as they control the output flow of the wafer lots.

Functions centered around the Output Planning System may be referred to as a Planning Module (418). It is assumed that data has been provided to the Output Planning System (404) from the Order-Entry Module (410). If it is a new order and it is determined that there are no available wafer lots that can be used for this new order, the Output Planning System (404) submits requests for starting orders to the Wafer Picking System (406), which will start appropriate numbers of wafers to satisfy the new order. The Output Planning System may also provide information about excessive wafer lots currently in the manufacturing process based on current inventories and work-in-process (WIP). As such, it has an order review module (420) that reviews the incoming order based upon the excess available to determine if opportunities exist to reroute or rework WIP for the newly input order to avoid starting new lots by the Wafer Picking System. Based on the planning result, the new order will be confirmed by a wafer initiation request confirmation module (422) so that the Wafer Picking System can start processing new wafer lots after adjustments made based on the analysis from the Output Planning System (404). This adjustment helps to reduce the waste in the production.

Functional modules labeled as (424) may be collectively referred to as a Smart Code Processing Module. Smart code processing applies to both new orders or change-orders. In the situation where a modification of an order or change-order (426) is made by a customer and conveyed to the operators in the Manufacturing Line Control, the Smart Code Processing Module is triggered to find the best solution for making the changes. The Smart Code Processing Module (424) works with the Planning Module (418) to analyze the orders and outstanding wafer lots, and orders that are determined to have opportunities for rerouting or rework of WIP will be identified. It has to be determined that one or more available wafer lots are of the same base feature and they have not been processed so far in the manufacturing process flow that it would prohibit them from being converted to another product with additional processing. In addition, it is also determined whether the wafers have the customer specific features processed or can have the customer specific features incorporated in future processes. When available wafer lots are found that are readily convertable to be further processed to make the desired products according to the change-order, the Smart Code Processing Module (408) reconfigures the lot identifiers, order numbers, and smart codes to take advantage of identified opportunities. The wafer lots that have been re-arranged to fulfill the need of the change-order will be confirmed by an order change confirmation module (428), and their new smart codes are assigned and saved and made available to various operators of the manufacturing management system. Furthermore, the reconfigured data with regard to the orders, smart codes, lots, and any other related data is submitted to the Output Planning System (404) to allow the updating of production planning. The Output Planning System then arranges for the final overall planning. In the case that after the available wafer lots are converted, and there is still a shortage of desired products, the Output Planning System (404) will inform the Auto Wafer Start System (402) to initiate new wafer lots.

As an alternative, instead of immediately assigning smart codes and initiating wafer lots for every new order, the Wafer Auto Start System (402) can optionally contact the Output Planning System (404) to check whether there are available wafer lots that can be converted to fulfill the need of the new order. The communication between these two systems is represented by the dashed line 430. If so, no wafer will be initiated and the existing wafer lots will be rearranged to be associated with the new order.

The present disclosure as described above thus provides an improved method for production management of change-orders. Various benefits are achieved over conventional approaches. For instance, opportunities for rerouting or rework of WIP are identified, thus reducing costly scrap and resource consuming restarts. In short, the improved method and system disclosed could significantly reduce scrap and rework, cost to the customer, lead time for delivery, and plant and material capacity planning.

It will also be understood by those skilled in the art that one or more of the elements/steps of the present disclosure may be implemented using software executed on a general purpose computer system or networked computer systems, using special purpose hardware-based computer systems, or using combinations of special purpose hardware and software.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for dynamically coordinating one or more product orders with product parts progressing through a manufacturing process flow, comprising:

identifying a first order for generating one or more lots of parts for manufacturing a first product, the first order identifying a predetermined base feature, one or more customer specific features, one or more order specific features, and the quantity of the first product;

assigning a smart code to the first order and the lots of parts, the smart code identifying an association between the first order and the lots of parts;

analyzing, based on the smart codes assigned thereto, whether one or more available lots of parts of a second order in production are ready to be converted to produce the first product; and dynamically changing the smart code of the available lots to the smart code of the first order if the available lots of the second order are chosen to be further processed for fulfilling the first order.

2. The method of claim 1 wherein the analyzing further includes determining that the one or more available lots of parts and the first product are of the same base feature.

3. The method of claim 1 wherein the analyzing further includes determining that the one or more available lots of parts have not been processed to a point that they are prohibited from being converted into the first product.

4. The method of claim 1 wherein the analyzing further includes determining that the one or more available lots of parts either have the customer specific features or can incorporate the customer specific features.

5. The method of claim 1 further comprising when the first order is modified, analyzing whether one or more available lots of parts in production that can be converted to fulfill the need of the modification of the first order.

6. The method of claim 5 further comprising initiating new lots of the parts if needed based on the analyzing result.

7. A method for dynamically re-arranging one or more orders with one or more wafer lots progressing through a manufacturing process flow, comprising:

identifying a modification of a first order, the first order being for generating one or more wafer lots for manufacturing a first product, the first order identifying a predetermined base feature, one or more customer specific features, one or more order specific features, and the quantity of the first product, and the first order and the wafer lots being associated by a smart code;

analyzing, based on the smart codes assigned thereto, whether one or more available wafer lots of a second order in production are ready to be converted to satisfy the modified first order; and dynamically changing the smart code of the available wafer lots to the smart code of the first order if the available wafer lots of the second order are chosen to be further processed for satisfying the modified first order.

8. The method of claim 7 wherein the analyzing further includes determining that the one or more available wafer lots and the first product have the same base feature.

9. The method of claim 7 wherein the analyzing further includes determining that the one or more available wafer lots have not been processed to a point that they are prohibited from being converted into the first product.

10. The method of claim 7 wherein the analyzing further includes determining that the one or more available wafer lots either have the customer specific features or can incorporate the customer specific features.

11. The method of claim 7 further comprising initiating new wafer lots if needed based on the analyzing result.

12. A semiconductor manufacturing management system for dynamically coordinating one or more product orders with wafer lots progressing through a manufacturing process flow, the system comprising:

an order entry module for identifying a modification of a first order, the first order being for generating one or more wafer lots for manufacturing a first product and identifying a predetermined base feature, one or more customer specific features, one or more order specific features, and the quantity of the first product, the order entry module assigning a smart code to the first order and the wafer lots for identifying an association therebetween;

a planning module for analyzing, based on the smart codes assigned thereto, whether one or more available wafer lots of a second order in production are ready to be converted to produce the first product; and a smart code processing module for dynamically changing the smart code of the available lots to the smart code of the first order if the available lots of the second order are chosen to be further processed for fulfilling the changed first order.

13. The system of claim 12 wherein the planning module further includes an output planning system and a wafer picking system.

14. The system of claim 12 wherein the order entry module further includes a wafer start system for initiating wafer lots.

15. The system of claim 12 wherein the planning module further includes means for providing information about excessive wafer lots.

16. The system of claim 12 wherein the smart code processing module further includes means for determining that the one or more available wafer lots and the first product have the same base feature.

17. The system of claim 12 wherein the smart code processing module further includes means for determining that the one or more available wafer lots have not been processed to a point that they are prohibited from being converted into the first product.

18. The system of claim 12 wherein the smart code processing module further includes means for reconfiguring the smart code for the available wafer lots of the second order when they are used to fulfill the first order.

19. The system of claim 12 wherein the smart code processing module further includes means for detecting the modification of the first order.

20. The system of claim 12 wherein the smart code processing module further includes means for confirming the modified first order.

* * * * *